United States Patent
Randall et al.

(10) Patent No.: US 11,034,188 B2
(45) Date of Patent: Jun. 15, 2021

(54) PNEUMATIC TIRE HAVING REINFORCING MEMBERS AND AIR BARRIER LAYER

(71) Applicant: Bridgestone Americas Tire Operations, LLC, Nashville, TN (US)

(72) Inventors: Amy M. Randall, Brentwood, TN (US); Craig R. Balnis, Akron, OH (US); David J. Zemla, Canal Fulton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 321 days.

(21) Appl. No.: 15/814,954

(22) Filed: Nov. 16, 2017

(65) Prior Publication Data

US 2018/0134082 A1 May 17, 2018

Related U.S. Application Data (60) Provisional application No. 62/423,345, filed on Nov. 17, 2016.

(51) Int. Cl.
*B29D 30/06* (2006.01)
*B60C 17/00* (2006.01)
(Continued)

(52) U.S. Cl.
CPC ............ *B60C 5/14* (2013.01); *B29D 30/0681* (2013.01); *B29D 30/72* (2013.01); *B60C 1/0008* (2013.01);
(Continued)

(58) Field of Classification Search
CPC .......... B29D 2030/724; B29D 30/0681; B29D 2030/0683; B29D 2030/201; B29D 30/72;
(Continued)

(56) References Cited

U.S. PATENT DOCUMENTS 3,935,893 A * 2/1976 Stang .................... B29C 73/163
152/504
4,539,344 A * 9/1985 Van Ornum .......... B29C 73/163
523/166
(Continued)

FOREIGN PATENT DOCUMENTS

DE 102005050677 A1 * 4/2007 ......... B60C 17/0009
EP 2277688 A1 1/2011
(Continued)

OTHER PUBLICATIONS

Machine Translation: DE-102005050677-A1;Buschmeier Joerg; (Year: 2020).*

(Continued)

*Primary Examiner* — Kendra Ly
(74) *Attorney, Agent, or Firm* — Meredith E. Hooker; Arthur M. Reginelli (57) ABSTRACT

A method of preparing a tire including the steps of: providing a cured tire, the tire including a first bead, a second bead, a carcass layer extending from the first bead to the second bead, and an optional innerliner layer disposed interior to the carcass layer; applying a pair of reinforcing members to the carcass layer or to the optional innerliner layer, if present; and applying an air barrier composition to the pair of reinforcing members, and to a portion of the carcass layer or to a portion of the optional innerliner layer to thereby form an air barrier layer.

9 Claims, 2 Drawing Sheets

(51) Int. Cl.
  *B60C 5/14* (2006.01)
  *B29D 30/72* (2006.01)
  *B60C 1/00* (2006.01)

(52) U.S. Cl.
  CPC .......... *B60C 5/142* (2013.01); *B60C 17/0009* (2013.01); *B29D 2030/0682* (2013.01); *B29D 2030/724* (2013.01)

(58) Field of Classification Search
  CPC .......... B29D 30/0061; B29D 2030/728; B29D 2030/722; B60C 17/08; B60C 17/0009; B60C 2001/0033; B60C 19/125; B60C 17/009; B60C 17/04; B60C 2017/063; B60C 19/122
  USPC .......................................... 152/516–522, 158
  See application file for complete search history.

(56) References Cited

U.S. PATENT DOCUMENTS

| | | | |
|---|---|---|---|
| 4,895,610 A | 1/1990 | Egan | |
| 6,230,773 B1 | 5/2001 | Sandstrom et al. | |
| 8,602,075 B2 | 12/2013 | Albert et al. | |
| 2004/0140042 A1 | 6/2004 | Teratani et al. | |
| 2006/0089447 A1* | 4/2006 | Robertson | C08L 53/02 524/493 |
| 2008/0173382 A1 | 7/2008 | Gobinath et al. | |
| 2008/0257476 A1 | 10/2008 | Pozzati et al. | |
| 2009/0084482 A1 | 4/2009 | Ramendra et al. | |
| 2009/0211683 A1 | 8/2009 | Takahashi | |
| 2010/0043937 A1 | 2/2010 | Matsunaga | |
| 2011/0059237 A1* | 3/2011 | Shibata | B60C 5/14 427/181 |
| 2011/0146860 A1 | 6/2011 | Ramendra et al. | |
| 2014/0034205 A1* | 2/2014 | Yukawa | B60C 17/0009 152/510 |
| 2016/0032215 A1 | 2/2016 | Voge | |
| 2016/0052349 A1 | 2/2016 | Elsawah | |

FOREIGN PATENT DOCUMENTS

| | | |
|---|---|---|
| EP | 2335913 A1 | 6/2011 |
| EP | 2397347 A1 | 12/2011 |
| JP | 2002-332475 A | 11/2002 |
| JP | 2009-269446 A | 11/2009 |
| JP | 2010-513121 A | 4/2010 |
| WO | 2003028986 A1 | 4/2003 |
| WO | 2012134454 A1 | 4/2012 |
| WO | 2016099695 A1 | 6/2016 |

OTHER PUBLICATIONS

Okel et al.; A Materials Approach to Fuel-Efficient Tires; Project ID # VS0884; May 18, 2012.
Martin et al.; A Materials Approach to Fuel-Efficient Tires; Project ID # VS0884; Jun. 19, 2014.
Kornish et al.; Final Technical Report for DOE/EERE (Materials Approach to Fuel-Efficient Tires); DE-EE0005359; Apr. 2, 2016.
EESR for European Application No. 17870726.1 dated Jun. 23, 2020, pp. 1-7.
Office Action for Japanese Application No. 2019-526219 dated Jun. 16, 2020.
EESR for European Application No. 17872331.8 dated May 25, 2020 pp. 1-7.
EESR for European Application No. 17871040.6 dated Jun. 9, 2020, pp. 1-8.

* cited by examiner

PNEUMATIC TIRE HAVING REINFORCING MEMBERS AND AIR BARRIER LAYER

CROSS REFERENCE TO RELATED APPLICATIONS

This application claims the benefit of U.S. Provisional Application Ser. No. 62/423,345, filed on Nov. 17, 2016, which is incorporated herein by reference.

FIELD OF THE INVENTION

Embodiments of the present invention generally relate to pneumatic tires and, more particularly, to pneumatic tires having air barrier layer applied on self-supporting inserts.

BACKGROUND OF THE INVENTION

In the art of making pneumatic tires, it is known to include an air permeation resistant film, which may be referred to as an air-resistant film or air barrier, in the inner surface of the tire in order to prevent air permeation from the inner air chamber. For example, U.S. Pat. No. 5,738,158 teaches a pneumatic tire having an air permeation prevention layer composed of a thin resin film including a thermoplastic polyester elastomer. The air permeation prevention layer can be adhered to the rubber tire by using various adhesive systems including isocyanate-based adhesives in conjunction with heat and pressure at the time of vulcanization and molding.

Pneumatic tires have also been modified by applying reinforcing members to the interior of the tire. These reinforcing members enable a pneumatic tire to run for a relatively long distance in an uninflated condition. For example, U.S. Pub. No. 2010/0126648 discloses a pair of annular side reinforcing rubber layers having a crescent cross-section, each located between a carcass layer and an innerliner layer.

SUMMARY OF THE INVENTION

One or more embodiments of the present invention provide a method of preparing a tire comprising the steps of (i) providing a cured tire, the tire including a first bead, a second bead, a carcass layer extending from the first bead to the second bead, and an optional innerliner layer disposed interior to the carcass layer; (ii) applying a pair of reinforcing members to the carcass layer or to the optional innerliner layer, if present; and (iii) applying an air barrier composition to the pair of reinforcing members, and to a portion of the carcass layer or to a portion of the optional innerliner layer to thereby form an air barrier layer.

Other embodiments of the present invention provide a pneumatic tire comprising a tread; a carcass; an optional innerliner layer; a pair of reinforcing members disposed on the carcass or on the optional innerliner layer, if present; an air barrier layer disposed on the pair of reinforcing members, and disposed on a portion of the carcass or on a portion of the optional innerliner layer, if present.

DETAILED DESCRIPTION OF ILLUSTRATIVE EMBODIMENTS

Embodiments of the present invention are based, at least in part, on pneumatic tires that include an air barrier layer disposed on a reinforcing member. In one or more embodiments, both the reinforcing member and the air barrier layer are applied after the tire is cured. In one or more embodiments, the air barrier layer is disposed on the cured inner surface of the tire. While the prior art contemplates pneumatic tires with air resistant films, these air resistant films are applied prior to curing the tire. The present invention applies the air barrier layer to the interior of a cured tire, particularly to a tire that has a reinforcing member disposed therein, and therefore the air barrier layer may advantageously serve a dual function of providing an air resistant film and holding a reinforcing member in place in the interior of the tire. Stated another way, the air barrier layer adheres or otherwise mates the reinforcing member to the interior of the tire.

Tire Structure

Aspects of the invention can be described with reference to FIGS. 1 and 2, which show tires 11 and 11', respectively, including carcass 13 extending between a pair of axially-spaced beads 15, 15'. Carcass 13 includes opposed turn-up portions 14, 14', which thereby cause body ply 13 to surround bead filler portions 16, 16', respectively. Abrasion strips 17, 17' partially encase body ply 13 at or near beads 15, 15'. Tire 11 further includes opposing sidewalls 19, 19', and tread portion 21, which forms the outermost circumferential surface of tire 11. Subtread 23 is disposed below tread 21, undertread 25 is disposed below subtread 23, and belt package 27 is disposed below undertread 25. Belt package 27, which may include a plurality of belts (not shown) is positioned above carcass 13, which itself may include one or more body plies (not shown). As shown only in FIG. 1, an innerliner 29 is disposed on the interior of carcass 13 relative to tread 21. FIG. 2, on the other hand, is devoid of an innerliner 29. As the skilled person will appreciate, tire 11 may also include various other components, which are not shown, such as, but not limited to, tread shoulders, cap plies, belt wedges, and belt shoulders.

According to embodiments of the present invention, tire 11 and 11' further include an air barrier layer 31 and a pair of reinforcing members 33, 33' which may also be referred to as reinforcing layers 33, 33', annular reinforcements 33, 33', side reinforcing layers 33, 33', or sidewall inserts 33, 33'. Tire 11 and 11' may therefore also be referred to as a self-supporting tire.

Figure 1:
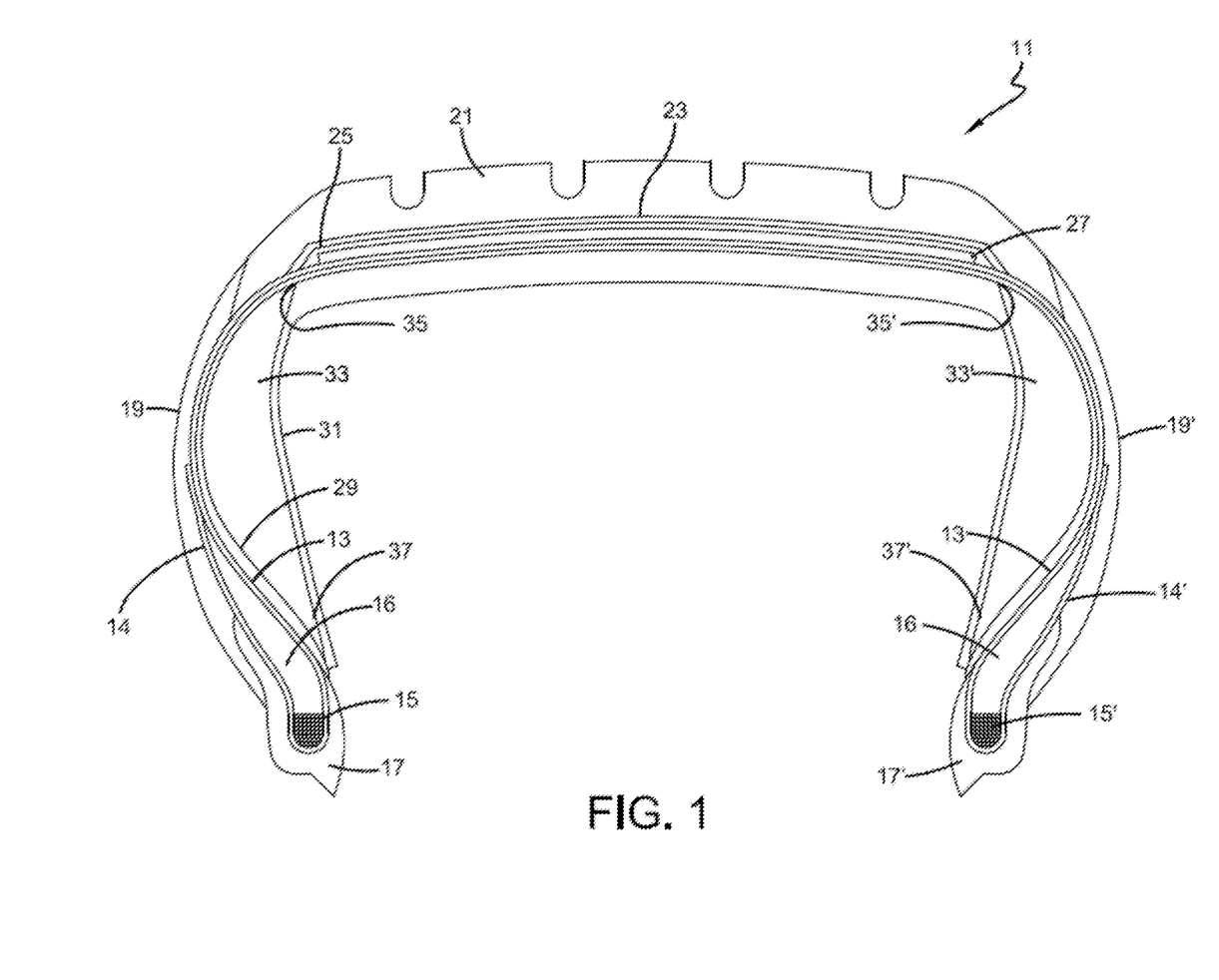
FIG. 1 is a cross-sectional view of a tire according to one or more embodiments of the invention.
Figure 2:
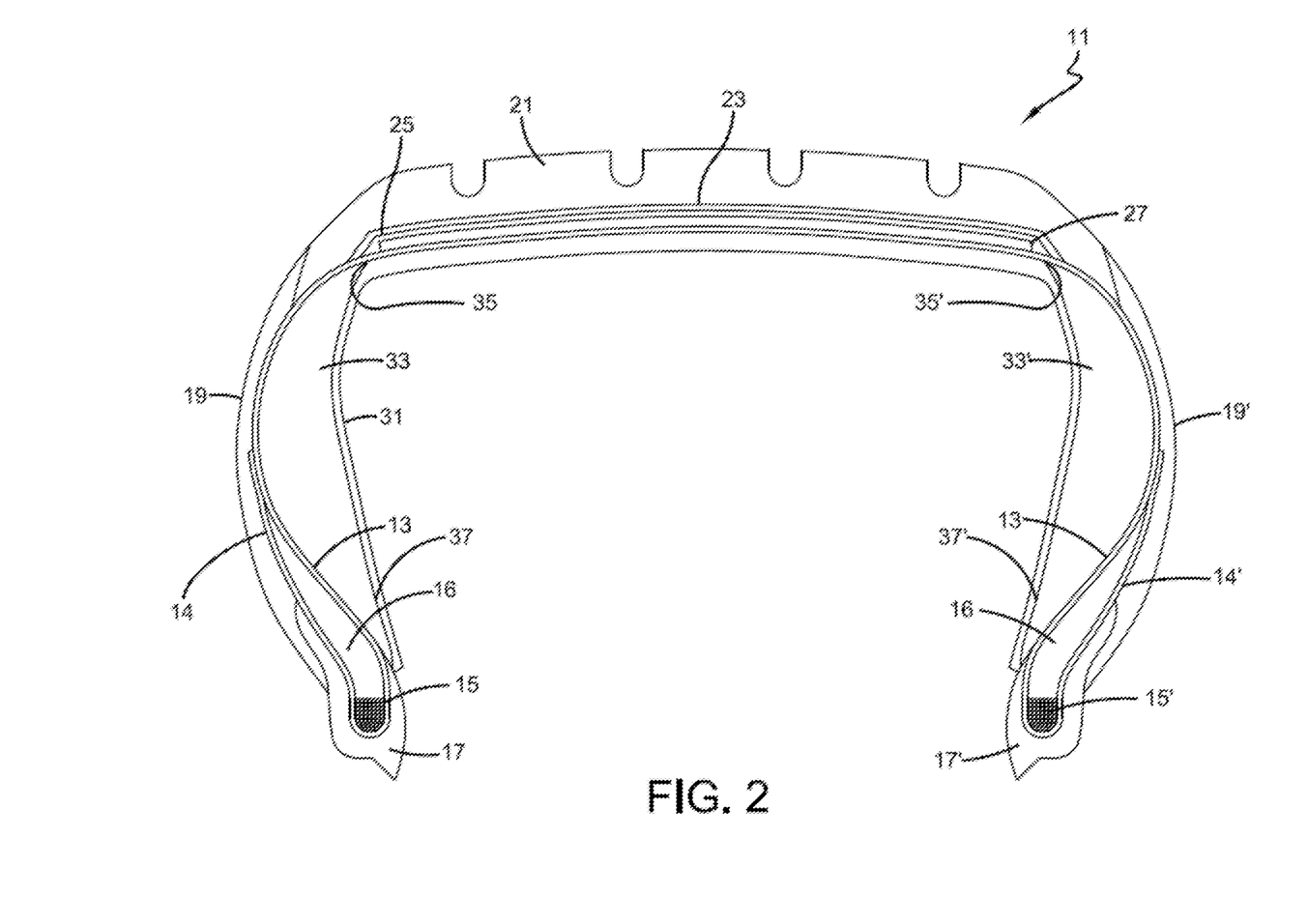
FIG. 2 is a cross-sectional view of a tire according to one or more embodiments of the invention.

As shown in FIG. 1, air barrier layer 31 is disposed on the interior of innerliner 29 relative to tread 21 and generally extends from a location proximate to first abrasion strip 17 to a location proximate second abrasion strip 17'. In alternate embodiments, as shown in FIG. 2, where tire 11' is without a separate innerliner portion, air barrier layer 31 is disposed directly on carcass 13 and generally extends from first abrasion strip 17 to second abrasion strip 17' (i.e. generally throughout the entire inner surface of carcass 13).

As shown in FIG. 1, reinforcing members 33, 33' may be disposed below innerliner 29 (i.e. interior to innerliner 29) relative to sidewalls 19, 19'. Each of the reinforcing members 33, 33' has one longitudinal edge 35, 35' disposed on the inner surface of innerliner 29 at a position near tread 21, and an opposing longitudinal edge 37, 37' near the corresponding bead 15, 15'.

In alternate embodiments, as shown in FIG. 2, reinforcing members 33, 33' are disposed below carcass 13 (i.e. interior to carcass 13) relative to sidewalls 19, 19'. Each of the reinforcing members 33, 33' has one longitudinal edge 35, 35' disposed on the inner surface of carcass 13 at a position near tread 21 and an opposing longitudinal edge 37, 37' near the corresponding bead 15, 15'.

Although not shown in the drawings, in one or more embodiments, air barrier layer 31 extends generally from longitudinal edge 35 of reinforcing member 33 to longitudinal edge 35' of reinforcing member 33'. That is, in one or more embodiments, air barrier layer 31 may not extend all the way to a location proximate to first abrasion strip 17 to a location proximate second abrasion strip 17', which, if present, would cover reinforcing members 33, 33' as shown in the drawings. In these embodiments, reinforcing members 33, 33' provide the function of air retention for the tire, especially in embodiments where the tire is devoid of a separate innerliner, along the area of carcass 13 where reinforcing members 33, 33' are disposed.

In one or more embodiments, reinforcing members 33, 33' generally correspond to sidewalls 19,19'. That is, reinforcing members 33, 33' have a length that generally extends with the length of a corresponding sidewall 19, 19'. In one or more embodiments, reinforcing members 33, 33' are generally coextensive with at least 90%, in other embodiments at least 70%, and in other embodiments at least 50% of the length of a corresponding sidewall 19, 19'. In one or more embodiments, reinforcing members 33, 33' extend the entire length of a corresponding sidewall 19, 19'.

Although not shown in the drawings, the tires of the present invention may include a layer of an adhesive layer between reinforcing members 33, 33' and at least one of the innermost layers of the tire. In particular embodiments, the adhesive layer may be disposed on the interior carcass layer 13, or in other embodiments it may be disposed on the interior innerliner layer 29. In one or more embodiments, the adhesive layer may be disposed only to correspond with the length of reinforcing members 33, 33'. As disclosed elsewhere herein, air barrier layer 33 may advantageously mate with innerliner 29 or carcass 13. Air barrier layer 33 may provide a layer or substrate that is more receptive to or more compatible with an adhesive that may be used to mate and bond reinforcing members 33, 33' to innerliner 29 or carcass 13 as compared to directly mating reinforcing members 33, 33' to innerliner 29 or carcass 13. In other embodiments, air barrier layer 33 serves to directly mate and bond reinforcing members 33, 33' to innerliner 29 or carcass 13.

The adhesive layer may include a variety of adhesives including those known it the art for bonding to cured rubber surfaces. In one more embodiments, the adhesive layer may derive from a pressure sensitive adhesive (e.g. a tape), or in other embodiments, the adhesive layer may derive from an adhesive cement (e.g. reactive adhesives and/or solvent borne adhesives).

In one or more embodiments, the adhesive layer may have advantageous adhesion to reinforcing members 33, 33'. In one or more embodiments, the adhesive layer may have an adhesion to the reinforcing members (e.g. reinforcing members 33, 33') of more than 5 N/mm, in other embodiments more than 10 N/mm, in other embodiments more than 15 N/mm, in other embodiments more than 30 N/mm, and in other embodiments more than 50 N/mm. In one or more embodiments, the adhesive layer may have an adhesion to the carcass of from about 1 N/mm to about 50 N/mm, in other embodiments from about 5 N/mm to about 30 N/mm, and in other embodiments from about 5 N/mm to about 15 N/mm. The adhesion may be measured by ASTM D903 or ASTM D1876.

Although not shown in the drawings, the tires of the present invention may include a layer of an anti-tack composition disposed to at least one of the innermost layers of the tire. In particular embodiments, the anti-tack composition, which may be referred to as an anti-tack coating, may be disposed on the interior carcass layer 13, or in other embodiments it may be disposed on the interior innerliner layer 29. In particular embodiments, the anti-tack composition may include a composition including a polymeric resin selected from acrylic resins and/or vinyl acetate copolymers as disclosed in U.S. Publication No. 2003/0230369, which is incorporated herein by reference.

Reinforcing Members

Practice of one or more embodiments of the present invention is not necessarily limited by the selection of the reinforcing members employed. The reinforcing members of one or more embodiments of the invention (e.g. reinforcing members 33) generally include an element that has sufficient strength to support one or more tire components (e.g. tread) at a sufficient distance from the wheel while the pneumatic tire is uninflated thereby enabling a pneumatic tire to run for a relatively long distance in an uninflated condition. Said another way, the reinforcing members substantially support the tire in a run flat condition.

Various reinforcing members are known for this particular purpose including those disclosed in U.S. Pat. Nos. 3,911, 987; 3,949,798; 3,954,131; 4,067,372; 4,202,393; 4,203, 481; 4,261,405; 4,265,288; 4,287,924; 4,365,659; 4,779, 658; 4,917,164; 4,929,684; 5,217,549; 5,309,970; 5,427, 166; 5,511,599; 5,769,980; 6,453,961; 6,488,797; 6,834, 696; 6,988,522; 7,409,974; and 8,590,586; and U.S. Publication No. 2010/0126648; all of which are incorporated herein by reference.

In one or more embodiments, the reinforcing members are fabricated from materials that are characterized by high compressive flex fatigue, high modulus, and/or low hysteresis loss. In particular embodiments, the reinforcing members are composites made of two more distinct materials. For example, in one or more embodiments, the reinforcing members may include polymeric materials such as, but not limited to, elastomeric polymers or polymer networks, polyurethanes, and thermoplastic materials. In these or other embodiments, the reinforcing members may also include metal materials such as metal belts or cords, carbon materials such as carbon fibers, reinforcing fabrics and/or cords, ceramic materials, or combinations of two or more thereof.

In one or more embodiments, the reinforcing members are a rubber composite including a cured (i.e. vulcanized) rubber reinforced with a reinforcing material such as fabric or steel cord. In one or more embodiments, the rubber may likewise be reinforced with reinforcing fibers or flock and/or reinforcing fillers. The reinforcing fibers may include either natural or man-made fibers and include, but are not limited to, fibers fabricated from cotton, aramid, nylon, polyester, PET, PEN, carbon fiber, steel, fiberglass, or any combination thereof. The reinforcing fillers may include organic and inorganic reinforcing fillers and include, but are not limited to, carbon black and silica.

In one or more embodiments, the reinforcing members include a sulfur-vulcanized rubber composition deriving from a vulcanizable composition that includes a rubbery polymer (e.g. natural rubber and diene (co)polymers) and a graft copolymer having an unsaturated polymer backbone (e.g. polyisoprene, diene (co)polymers or EPDM) and having pendently grafted thereto a polymerized metal salt of an unsaturated carboxylic acid. In certain embodiments, the polymerized metal salt is poly-zinc dimethyacrylate and is used in combination with a carbon black reinforcing filler.

In one or more embodiments, the reinforcing members are not sulfur crosslinked to an adjacent tire component. For example, in one or more embodiments, the reinforcing members are not sulfur crosslinked to an innerliner. In other embodiments, the reinforcing members are not sulfur crosslinked to the carcass.

In one or more embodiments, the reinforcing members may be characterized by a Shore A hardness at 100° C. of more than 45, in other embodiments more than 50, in other embodiments more than 55, in other embodiments more than 60. In one or more embodiments, the reinforcing members may be characterized by a Shore A hardness at 100° C. of less than 100, in other embodiments less than 90, in other embodiments less than 80, in other embodiments less than 70.

In one or more embodiments, the reinforcing members may be characterized by a tan delta (100° C. at 10 Hertz) of less than 0.22, in other embodiments less than 0.20, in other embodiments less than 0.11, in other embodiments less than 0.07, in other embodiments less than 0.05, and in other embodiments less than 0.03. In these or other embodiments, the reinforcing members may be characterized by a tan delta (100° C. at 10 Hertz) of from about 0.01 to about 0.1, or in other embodiments from about 0.02 to about 0.05.

In one or more embodiments, the reinforcing members may be characterized by a storage modulus (60° C., 52 Hertz, 1% strain) of more than 4 MPa, in other embodiments more than 6 MPa, and in other embodiments more than 8 MPa. In these or other embodiments, the reinforcing members may be characterized by a storage modulus of less than 20 MPa, in other embodiments less than 18 MPa, and in other embodiments less than 16 MPa. In these or other embodiments, the reinforcing members may be characterized by a storage modulus (60° C., 52 Hertz, 1% strain) of from about 4 to about 20 MPa, in other embodiments from about 6 to about 19 MPa, and in other embodiments from about 7 to about 18 MPa.

In one or more embodiments, the reinforcing members may be characterized by an elastic modulus of more than 5 kg/cm$^2$, in other embodiments more than 10 kg/cm$^2$, in other embodiments more than 20 kg/cm$^2$, in other embodiments more than 25 kg/cm$^2$. In these or other embodiments, the reinforcing members may be characterized by an elastic modulus of less than 70 kg/cm$^2$, in other embodiments less than 60 kg/cm$^2$, in other embodiments less than 45 kg/cm$^2$, in other embodiments less than 30 kg/cm$^2$.

In one or more embodiments, the reinforcing members may be characterized by the 100% tension modulus properties described in U.S. Publication No. 2010/0126648, incorporated herein by reference.

In or more embodiments, the reinforcing members are shaped to be positioned within the interior of a tire proximate to the sidewall. Stated another way, the reinforcing members may be adapted to be received within the interior of the tire adjacent the carcass opposite the sidewall. In one or more embodiments, the reinforcing members are crescent shaped. In these or other embodiments, the longitudinal ends of the reinforcing members are tapered, with each tapered end extending toward the middle to a maximum thickness portion of reinforcing members. In one or more embodiments, the reinforcing members are utilized to achieve a substantially constant sidewall thickness, which configuration is further disclosed in U.S. Pat. No. 7,448,422, which is incorporated herein by reference.

In one or more embodiments, the reinforcing members may have a maximum thickness of greater than 3 mm, in other embodiments greater than 6 mm, and in other embodiments greater than 9 mm. In these or other embodiments, the reinforcing members may have a maximum thickness of less than 18 mm, in other embodiments less than 15 mm, and in other embodiments less than 12 mm. In one or more embodiments, the reinforcing members may have a maximum thickness of from about 3 to about 18 mm, in other embodiments from about 6 to about 15 mm, and in other embodiments from about 9 to about 12 mm.

Air Barrier Layer

In one or more embodiments, the air barrier layer (e.g. air barrier layer 31) may be generally described with respect to one or more properties of the air barrier layer.

The air barrier layer of one or more embodiments of the present invention (e.g. air barrier layer 31) generally includes a polymeric layer that has low permeability to air; i.e. low permeability to oxygen, nitrogen and carbon dioxide. The low permeability to air may be described in terms of the oxygen permeability ($P(O_2)$), which may also be referred to as oxygen permeance. The $P(O_2)$ number quantifies the amount of oxygen that can pass through the polymeric layer under a specific set of circumstances and is generally expressed in units of cc·mm/m$^2$·day·atm. This is a standard unit of permeation measured as cubic centimeters of oxygen permeating through one millimeter thickness of a sample, of an area of a square meter, over a 24 hour period, under a partial pressure differential of one atmosphere at a specific temperature and relative humidity (R.H.) conditions. In one or more embodiments, the oxygen permeability ($P(O_2)$) may be measured in accordance with ASTM method F1927-14 which measures $O_2$ transmission rates at 23° C. at 50% relative humidity.

In one or more embodiments, the air barrier layer of the tires of the present invention (e.g. air barrier layer 31) may have a $P(O_2)$ of less than 500, in other embodiments less than 250, in other embodiments less than 150, in other embodiments less than 100, in other embodiments less than 80, and in other embodiments less than 50, cc·mm/m$^2$·day·atm. In one or more embodiments, the air barrier layer may have a $P(O_2)$ of from about 0.01 to about 500 cc·mm/m$^2$·day·atm, in other embodiments from about 0.1 to about 100 cc·mm/m$^2$·day·atm, in other embodiments from about 50 to about 100 cc·mm/m$^2$·day·atm, and in other embodiments from about 50 to about 80 cc·mm/m$^2$·day·atm.

In one or more embodiments, the air barrier layer of the tires of the present invention (e.g. air barrier layer 31) may have advantageous adhesion to another component of the tire. The adhesion may be measured by ASTM D903 or ASTM D1876.

In one or more embodiments, the air barrier layer of the tires of the present invention (e.g. air barrier layer 31) may have an adhesion to the carcass (e.g. carcass 13) of more than 5 N/mm, in other embodiments more than 10 N/mm, in other embodiments more than 15 N/mm, in other embodiments more than 30 N/mm, and in other embodiments more than 50 N/mm. In one or more embodiments, the air barrier layer may have an adhesion to the carcass of from about 1 N/mm to about 50 N/mm, in other embodiments from about 5 N/mm to about 30 N/mm, and in other embodiments from about 5 N/mm to about 15 N/mm.

In one or more embodiments, the air barrier layer of the tires of the present invention (e.g. air barrier layer 31) may have an adhesion to the innerliner (e.g. innerliner 29) of more than 5 N/mm, in other embodiments more than 10 N/mm, in other embodiments more than 15 N/mm, in other embodiments more than 30 N/mm, and in other embodiments more than 50 N/mm. In one or more embodiments, the air barrier layer may have an adhesion to the innerliner of from about 1 N/mm to about 50 N/mm, in other embodiments from about 5 N/mm to about 30 N/mm, and in other embodiments from about 5 N/mm to about 15 N/mm.

In one or more embodiments, the air barrier layer of the tires of the present invention (e.g. air barrier layer 31) may have an adhesion to the reinforcing members (e.g. reinforcing members 33, 33') of more than 350 N/mm, in other embodiments more than 750 N/mm, in other embodiments more than 1000 N/mm, in other embodiments more than 1200 N/mm, and in other embodiments more than 1500 N/mm. In one or more embodiments, the air barrier layer may have an adhesion to the reinforcing members of from about 1 N/mm to about 1500 N/mm, in other embodiments from about 350 N/mm to about 1200 N/mm, and in other embodiments from about 350 N/mm to about 1000 N/mm.

The air barrier layer of one or more embodiments of the present invention (e.g. air barrier layer 31) may be generally characterized with respect to the composition of the air barrier layer.

Practice of one or more embodiments of the invention is not necessarily limited by the selection of any particular air barrier composition for the air barrier layer. Various air barrier compositions are known for this particular purpose, as generally disclosed in U.S. Pat. Nos. 5,840,825; 6,309,757; 6,521,706; 7,730,919; 7,798,188; 7,905,978; 7,954,528; 7,976,666; 8,021,730; 8,534,331; and 8,835,592; and U.S. Publication Nos. 2008/0047646; 2009/0038727; 2008/0152935; 2010/0174032; and 2015/0368512, which are incorporated herein by reference.

In one or more embodiments, an air barrier composition may include two or more polymeric components, each having a distinct glass transition temperature ($T_g$). In one or more embodiments, the two or more polymeric components may be sufficiently blended to provide the blended composition with a glass transition temperature that is distinct from the glass transition temperatures of the two or more polymeric components. In one or more embodiments, the air barrier layer composition of one or more embodiments of the present invention includes at least one glass transition temperature ($T_g$) peak, from one component of the air barrier layer, of less than −20° C., in other embodiments, less than −30° C., and in other embodiments, less than −40° C. Glass transition temperature may be measured by differential scanning calorimetry. In these or other embodiments, the air barrier layer composition includes a second glass transition temperature ($T_g$) peak of greater than 0° C., in other embodiments, greater than 10° C., and in other embodiments greater than 20° C.

In one or more embodiments, an air barrier composition is a polymeric composition including a thermoplastic and elastomeric component. In one or more embodiments, the air barrier layer is phase-separated polymeric system wherein an elastomeric component is phase separated from a thermoplastic component (e.g. soft and hard domains). In certain embodiments, the thermoplastic component is dispersed within the elastomeric component. In other embodiments, the elastomeric component is dispersed within the thermoplastic component. In yet other embodiments, the thermoplastic component and the elastomeric component are co-continuous. An exemplary embodiment includes a first phase with a polyurethane and a second phase with a polysulfide elastomer, and in certain embodiments, the polyurethane provides the continuous phase while polysulfide forms the discontinuous phase.

In one or more embodiments, an air barrier layer may be formed from an air barrier coating composition that is an aqueous dispersion or latex. In one or more embodiments, this aqueous dispersion may include more than 10 wt. % solids, in other embodiments more than 20 wt. % solids, in other embodiments more than 25 wt. % solids, in other embodiments more than 40 wt. % solids, and in other embodiments more than 45, wt. % solids. In one or more embodiments, an aqueous medium having a dispersion of one or more polymeric materials therein may include from about 10 to about 45 wt. % solids, in other embodiments from about 20 to about 40 wt. % solids, and in other embodiments from about 20 to about 25 wt. % solids.

In particular embodiments, the air barrier layer includes a blend of polyurethane and elastomeric polymer. As disclosed in U.S. Publ. No. 2010/0174032, which is incorporated herein by reference, the polyurethane may include a polyurethane wherein at least 30 wt % of the mer units derive from a meta-substituted aromatic material, such as a meta-substituted aromatic isocyanate. In these or other embodiments, as disclosed in U.S. Publ. No. 2015/0368512, which is incorporated herein by reference, these compositions may derive from aqueous dispersions of polyurethane, a polysulfide, and a curative such as magnesium oxide. In one or more embodiments, an air barrier composition can include aqueous dispersed polyurethanes. In one or more embodiments, an air barrier composition can include aqueous dispersed polyvinylidene chloride copolymers.

In one or more embodiments, the polyurethane can have reactive functional groups. As used here, a reactive functional group refers to an atom, group of atoms, functionality, or group having sufficient reactivity to form at least one covalent bond with another reactive group in a chemical reaction. For example, a polyurethane can include reactive functional groups that are reactive with themselves or with another component, such as a crosslinker. Examples of reactive functional groups include mercapto or thiol groups, hydroxyl groups, (meth)acrylate groups, carboxylic acid groups, amine groups, epoxide groups, carbamate groups, amide groups, urea groups, isocyanate groups (including blocked isocyanate groups), and combinations thereof.

In one or more embodiments, a polyurethane can be substantially free or completely free of reactive functional groups. As used here, the term substantially free means a polyurethane may contain less than 1000 parts per million (ppm), and completely free means less than 20 parts per billion (ppb), of reactive functional groups. In one or more embodiments, a polyurethane may include aqueous dispersed polyurethanes that are completely free of reactive functional groups.

In one or more embodiments, an air barrier composition may include thermoplastic polymer (e.g. polyurethane) in an amount of more than 5 wt. %, in other embodiments, more than 10 wt. %, and in other embodiments, more than 15 wt. %, based on the total solid weight of the air barrier composition. In one or more embodiments, an air barrier composition may include thermoplastic polymer in an amount of less than 75 wt. %, in other embodiments, less than 50 wt. %, in other embodiments, less than 35 wt. %, and in other embodiments, less than 20 wt. %, based on the total solid weight of the air barrier composition. In one or more embodiments, an air barrier composition may include thermoplastic polymer in an amount of from about 5 wt. % to about 75 wt. %, in other embodiments, from about 10 wt. % to about 50 wt. %, and in other embodiments, from about 10 wt. % to about 20 wt. %, based on the total solid weight of the air barrier composition. The weight % may be determined by standard gel permeation chromatography.

In one or more embodiments, an air barrier composition includes a polysulfide. The polysulfide may act as an elastomeric material in the air barrier layer. The term polysulfide refers to a polymer that contains one or more disulfide linkages (i.e. —[S—S]—) linkages, in the polymer backbone, and/or in the terminal or pendant positions on the polymer chain. A polysulfide polymer can have two or more sulfur-sulfur linkages. A polysulfide can also include a mixture of primary disulfides and higher rank polysulfides such as tri and tetra polysulfide linkages (S—S—S; S—S—S—S). Further, a polysulfide can include mercapto or thiol functional groups (an —SH group). For instance, a polysulfide can be represented by chemical formula (I)

where each R can independently be —(CH$_2$—CH$_2$—O—CH$_2$—O—CH$_2$—CH$_2$)— and a+b+c+d can be a number up to and including 1,000. A polysulfide that can be used with the present invention can also be represented by chemical formula (II):

where n can be a number up to and including 1,000. Exemplary polysulfides are those commercially available under the trade name THIOPLAST®, a liquid polysulfide polymer with mercapto end groups supplied by Akzo Nobel, Greiz, Germany.

In one or more embodiments, a polysulfide can have a glass transition temperature ($T_g$) of less than 0° C., as measured by differential scanning calorimetry. In other embodiments, a polysulfide can have a glass transition temperature ($T_g$) of less than –10° C., in other embodiments, less than –20° C., and in other embodiments, less than –30° C.

In one or more embodiments, an air barrier composition may be substantially free or may be completely free of all other elastomeric materials, except for polysulfides. As used here, the term substantially free means an air barrier composition may contain less than 1000 parts per million (ppm), and completely free means less than 20 parts per billion (ppb), of all other elastomeric materials, except for polysulfides.

In other embodiments, an air barrier composition may include a polysulfide and an additional elastomeric material. Exemplary additional elastomeric materials that can be used include acrylonitriles, natural and synthetic rubbers such as aqueous butyl rubber dispersions, styrenic thermoplastic elastomers, polyamide elastomers, thermoplastic vulcanizates, flexible acrylic polymers, and combinations thereof.

In one or more embodiments, an air barrier composition may include elastomeric polymer (e.g. polysulfide) in an amount of more than 5 wt. %, in other embodiments, more than 10 wt. %, in other embodiments, more than 15 wt. %, in other embodiments, more than 25 wt. %, and in other embodiments, more than 50 wt. %, based on the total solid weight of the air barrier composition. In one or more embodiments, an air barrier composition may include elastomeric polymer in an amount of less than 80 wt. %, in other embodiments, less than 75 wt. %, and in other embodiments, less than 70 wt. %, based on the total solid weight of the air barrier composition. In one or more embodiments, an air barrier composition may include elastomeric polymer in an amount of from about 5 wt. % to about 80 wt. %, in other embodiments, from about 25 wt. % to about 75 wt. %, and in other embodiments, from about 50 wt. % to about 70 wt. %, based on the total solid weight of the air barrier composition. The weight % may be determined by standard gel permeation chromatography.

In one or more embodiments, an air barrier composition may include one or more inorganic materials. As used herein, an inorganic material refers to materials and substances that are not organic, i.e., do not include carbon-based materials. The one or more inorganic materials may include one or more platy inorganic fillers. As used herein, a platy inorganic filler refers to an inorganic material in the platy form. The term platy refers to a structure in which one dimension is substantially smaller than the two other dimensions of the structure resulting in a flat type appearance. The platy inorganic fillers are generally in the form of stacked lamellae, sheets, platelets, or plates with a relatively pronounced anisometry. The inorganic materials, such as the platy inorganic fillers, can further improve the barrier performance of the resulting air barrier layer by reducing the permeability of liquids and gases.

Suitable platy inorganic fillers can include those having a high aspect ratio. Suitable high aspect ratio platy inorganic fillers include, for example, vermiculite, mica, talc, wollastonite, chlorite, metal flakes, platy clays, and platy silicas. In one or more embodiments, a filler has a diameter of from 1 to 20 microns, in other embodiments, from 2 to 10 microns, and in other embodiments, from 2 to 5 microns. In one or more embodiments, the aspect ratio of the fillers can be at least 5:1, in other embodiments, at least 10:1, and in other embodiments, at least 20:1. For example, mica flakes may have an aspect ratio of 20:1, talc may have an aspect ratio of 10:1 to 20:1, and vermiculite may have an aspect ratio of from 200:1 to 10,000:1.

In one or more embodiments, as disclosed in U.S. Pat. No. 8,534,331, the air barrier layer includes a two-phase system where an elastomer is dispersed within a thermoplastic matrix. In certain embodiments, the thermoplastic may include nylon and the elastomer may include butyl rubber and/or a sulfur-curable diene based elastomer.

In one or more embodiments, an air barrier composition may include a rheology agent. As generally known to those skilled in the art, rheology agents are those materials that help to improve the flow properties of a composition. An exemplary rheology agent is a polypropylene glycol solution of a urea modified polyurethane In one or more embodiments, the air barrier layer of the tires of the present invention (e.g. air barrier layer 31) may have a thickness of more than 8 mils, in other embodiments more than 10 mils, in other embodiments more than 14 mils, and in other embodiments more than 16 mils. In these or other embodiments, the air barrier layer may have a thickness of less than 28 mils, in other embodiments less than 25 mils, in other embodiments less than 20 mils, and in other embodiments less than 18 mils. In one or more embodiments, the air barrier layer may have a thickness of from about 5 mils to about 28 mils, in other embodiments from about 8 mils to about 25 mils, in other embodiments from about 10 mils to about 22 mils, and in other embodiments from about 15 mils to about 20 mils.

In one or more embodiments, the composition of the air barrier layer is not sulfur crosslinked to an adjacent tire component. For example, in one or more embodiments, the composition of the air barrier layer is not sulfur crosslinked to the innerliner. In other embodiments, the composition of the air barrier layer is not sulfur crosslinked to the carcass.

In one or more embodiments, the composition of the air barrier layer is sulfur crosslinked to an adjacent tire component. For example, in one or more embodiments, the composition of the air barrier layer is sulfur crosslinked to the innerliner. In other embodiments, the composition of the air barrier layer is sulfur crosslinked to the carcass.

Other Tire Components

The various tire components associated with the tires of the present invention may be prepared from conventional vulcanizable compositions of matter. Accordingly, practice of one or embodiments of the present invention does not alter conventional practice for preparing the various tire components. Generally speaking, these vulcanizable compositions may include an elastomer, a filler, and a curative, as well as other ingredients including, but not limited to, antidegradants, cure activators, cure accelerators, oils, resins, plasticizers, pigments, fatty acids, zinc oxide, and peptizing agents.

Rubber

As suggested above, the various tire components can be prepared using a vulcanizable composition that includes a rubber. In one or more embodiments, the rubber, which may also be referred to as a vulcanizable rubber or elastomer, may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms. In particular embodiments, a vulcanizable composition includes a blend of natural rubber and synthetic diene rubber such as polybutadiene. In other embodiments, a vulcanizable composition includes olefinic rubber such ethylene-propylene-diene rubber (EPDM).

Filler

As suggested above, the various tire components can be prepared using a vulcanizable composition that includes a filler. The filler may include one or more conventional reinforcing or non-reinforcing fillers. For example, useful fillers include carbon black, silica, alumina, and silicates such as calcium, aluminum, and magnesium silicates.

In one or more embodiments, carbon blacks include furnace blacks, channel blacks, and lamp blacks. More specific examples of carbon blacks include super abrasion furnace (SAF) blacks, intermediate super abrasion furnace (ISAF) blacks, high abrasion furnace (HAF) blacks, fast extrusion furnace (FEF) blacks, fine furnace (FF) blacks, semi-reinforcing furnace (SRF) blacks, medium processing channel blacks, hard processing channel blacks, conducting channel blacks, and acetylene blacks. Representative carbon blacks useful in one or more embodiments may include those designated by ASTM D1765 as N326, N330, N339, N343, N347, N351, N358, N550, N650, N660, N762, N772, and N774.

In particular embodiments, the carbon blacks may have a surface area (EMSA) of at least 20 $m^2/g$, in other embodiments at least 35 $m^2/g$, in other embodiments at least 50 $m^2/g$, in other embodiments at least 60 $m^2/g$; surface area values can be determined by ASTM D-1765 using the cetyltrimethylammonium bromide (CTAB) technique. In particular embodiments, a vulcanizable composition includes carbon black filler having a surface area (EMSA) of from about 60 to about 110 $m^2/g$. The carbon blacks may be in a pelletized form or an unpelletized flocculent form. The preferred form of carbon black may depend upon the type of mixing equipment used to mix the rubber compound.

In one or more embodiments, the filler may include silica. When silica is used as a filler, the silica may be employed in conjunction with a coupling agent. In these or other embodiments, the silica may be used in conjunction with a silica dispersing agent.

In one or more embodiments, useful silicas include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. In particular embodiments, the silica is a precipitated amorphous wet-processed hydrated silica. In one or more embodiments, these silicas are produced by a chemical reaction in water, from which they are precipitated as ultra-fine, spherical particles. These primary particles are believed to strongly associate into aggregates, which in turn combine less strongly into agglomerates.

Some commercially available silicas that may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in J. Am. Chem. Soc., vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

In one or more embodiments, the pH of silica may be from about 5 to about 7 or slightly over 7, or in other embodiments from about 5.5 to about 6.8.

In one or more embodiments, useful silica coupling agents include sulfur-containing silica coupling agents. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano)tetrasulfides. Exemplary silica dispersing aids include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler.

Curative

As suggested above, the various tire components can be prepared using a vulcanizable composition that includes a curative. A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3rd Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2nd Ed. 1989), which are incorporated herein by reference. In one or more embodiments, the curative is sulfur. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like.

Other ingredients that are typically employed in rubber compounding may also be added to the rubber compositions employed for fabricating the various components of the tires of the invention. These include oils, plasticizer, waxes, scorch inhibiting agents, processing aids, zinc oxide, tackifying resins, reinforcing resins, fatty acids such as stearic acid, and peptizers. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Method of Preparing Tires

The tires of the invention may be fabricated by employing conventional rubber shaping, molding, and curing techniques. In one or more embodiments, vulcanization can be effected by heating the vulcanizable composition within a mold. In one or more embodiments, the composition can be heated at an internal temperature from about 120° C. to about 180° C.

The cured or crosslinked rubber compositions (i.e., vulcanizates) generally include three-dimensional polymeric networks that are thermoset. Other ingredients, such as processing aids and fillers, are generally dispersed throughout the vulcanized network. Tire preparation is discussed in U.S. Pat. Nos. 5,866,171, 5,875,527, 5,931,211, and 5,971,046, which are incorporated herein by reference. Rubber compounding techniques and the additives employed therein are generally known as also disclosed in The Compounding and Vulcanization of Rubber, in Rubber Technology ($2^{nd}$ Ed. 1973), which is incorporated herein by reference.

As suggested in the Figures, the tires of the present invention can be prepared with or without an innerliner component. In one or more embodiments, where an innerliner is present, the innerliner is co-cured and therefore sulfur-crosslinked to the other rubber components such as the adjacent carcass or body plies.

Method of Applying Reinforcing Member

As indicated above, the reinforcing members associated with the tires of this invention are applied after a cured tire is provided. In other words, the reinforcing members are applied to a tire that has undergone the vulcanization (i.e. curing) process associated with the manufacture of the tire. In one or more embodiments, applying the reinforcing members to a tire that has undergone the vulcanization process associated with the manufacture of the tire reduces the time required to fully cure the tire.

Thus, once a cured tire has been provided, the reinforcing members are applied to the tire. The reinforcing members may be applied to the tire by positioning the reinforcing member within the tire at a desired location and then applying the air barrier layer to the reinforcing member as well as to the other desired interior portions of the tire. In one or more embodiments, the reinforcing member is at least temporarily secured at a desired location using an adhesive. In other embodiments, the reinforcing member is at least temporarily secured into place by using mechanical means. In yet other embodiments, the reinforcing member is at least temporarily secured into a desired location by using the air barrier composition prior to curing; i.e. the air barrier layer is applied to the interior of the tire at a location where the reinforcing member is to be placed, and then the reinforcing member is set into place.

The reinforcing members may be provided within the interior of a tire using a variety of techniques. In one or more embodiments, the reinforcing members may be applied to the tire by the direct application of a solid composition that may be adhered directly to the innerliner layer of a cured tire. In other embodiments, where the cured tire is provided without a separate innerliner, the reinforcing members may be applied directly to the body ply or tire carcass.

As mentioned above, in one or more embodiments, an adhesive is employed to mate and/or bond the reinforcing members to the carcass or innerliner of the tire. As suggested above, the adhesive layer may derive from or include pressure sensitive adhesives, as well as the adhesive cements. These adhesives may include olefin-based adhesives, diene-based adhesives, acrylate-based pressure sensitive adhesives, polyurethanes, and epoxies. Specific examples of adhesives include synthetic-rubber-based adhesive including those dissolved by an organic solvent as well as water borne latexes, and acrylate or rubber-based pressure-sensitive adhesive tapes. The skilled person will be able to readily determine an appropriate method for applying the adhesive layer depending on the nature of the adhesive. For example, solvent-borne or liquid-based adhesives can be applied by spraying, brushing or other coating techniques. Hot-melt adhesives can also be applied by using extrusion techniques. And, tapes or other solid forms of pressure sensitive adhesives can applied by using conventional techniques.

In one or more embodiments, an intermediary layer is disposed below the reinforcing members (i.e. interior to the reinforcing members). For example, an intermediary layer may include a primer layer, a release agent layer, an adhesive, or a combination of two or more thereof.

In one or more embodiments, a primer layer may be present where there is a desire to improve the adhesion of the reinforcing members to the innerliner or carcass. An exemplary primer layer may include a composition including butyl rubber, such as those disclosed in U.S. Pat. No. 5,985,981, which is incorporated herein by reference.

As the skilled person will appreciate, release agents, such as silicone or silicone-based compositions, may be used during the tire manufacturing process. As a result, practice of the present invention may include applying the reinforcing members to a layer or film of release agent. In other embodiments, efforts may be made to remove or otherwise treat the release agents prior to application of the reinforcing members. As a result, practice of the present invention may include application of the reinforcing members to a residue of a release agent; for example, a residue resulting from the chemical treatment of a release agent layer or film.

Method of Applying Air Barrier

As indicated above, the air barrier layer associated with the tires of this invention is applied after a cured tire is provided. In other words, the air barrier layer is applied to a tire that has undergone the vulcanization (i.e. curing) process associated with the manufacture of the tire. Also, in one or more embodiments, the air barrier layer is applied after the reinforcing members are positioned into place. That is, once a cured tire having reinforcing members has been provided, the air barrier layer may be applied to the tire. The air barrier layer may be applied to the tire by the direct application of a liquid or otherwise flowable composition that forms a wet or green coating that then dries or cures to form the air barrier layer. In other embodiments, the air barrier layer is applied through a transfer coating; i.e. a liquid or otherwise flowable composition that forms a wet or green coating is applied to a transfer substrate, such as a release member, the wet or green coating is allowed to dry or otherwise cure into a solids composition, and then the solids composition is applied to the tire and the transfer substrate is removed.

As suggested by the drawings, in one or more embodiments, the air barrier layer may be applied directly to the reinforcing members and a portion of the innerliner layer of a cured tire. In other embodiments, where the cured tire is provided without a separate innerliner, the air barrier layer may be applied directly to the reinforcing members and a portion of the body ply or tire carcass. As mentioned above, in one or more embodiments, the air barrier layer is not applied to the reinforcing members, and is only applied to a portion of the innerliner layer of a cured tire or to a portion of the body ply or tire carcass.

In one or more embodiments, an intermediary layer is disposed below the air barrier (i.e., interior to the air barrier layer). For example, an intermediary layer may include a primer layer or a release agent layer, or a combination thereof.

In one or more embodiments, a primer layer may be present where there is a desire to improve the adhesion of the air barrier layer to another component of the tire. An exemplary primer layer may include a composition including butyl rubber, such as those disclosed in U.S. Pat. No. 5,985,981, which is incorporated herein by reference.

As the skilled person will appreciate, release agents, such as silicone or silicone-based compositions, may be used during the tire manufacturing process. As a result, practice of the present invention may include applying the air barrier layer to a layer or film of release agent. In other embodiments, efforts may be made to remove or otherwise treat the release agents prior to application of the air barrier layer. As a result, practice of the present invention may include application of the air barrier layer to a residue of a release agent; for example, a residue resulting from the chemical treatment of a release agent layer or film.

In those embodiments where the air barrier layer derives from a liquid or otherwise flowable composition, the composition may be applied directly to the tire, or applied to a transfer member, by using a variety of techniques to form a wet or green coating layer. For example, the liquid or flowable composition may be applied by spraying, roll-coating, knife coating, extrusion, or similar techniques. In one or more embodiments, the air barrier composition has a viscosity that is low enough to allow the composition to be spray applied to the innerliner or carcass.

Following application of the air barrier layer to the interior of the tire, further steps may be taken to expedite drying or curing of the air barrier layer. In certain embodiments, the composite (i.e. tire with air barrier layer and reinforcing members) is allowed to air dry at standard conditions of temperature and pressure. In other embodiments, the composite is heated (e.g. to 100° C.-150° C.).

Where the air barrier layer is applied to the cured tire via a transfer coating, the solids composition can be mated to at least a portion of the innerliner or carcass layer by using standard techniques that may include, for example, mating the solids composition to at least a portion of the carcass or innerliner and then applying pressure, such as by way of a roller.

Advantageously, embodiments of the invention provide an air barrier composition that is capable of adhering with the vulcanized rubber of the innerliner or carcass. Thus, in these embodiments, since the air barrier layer is disposed on the reinforcing members and a portion of the innerliner or carcass, the air barrier layer is able to further secure the reinforcing members in place.

INDUSTRIAL APPLICABILITY

In one or more embodiments, tires of the present invention, which may also be referred to as pneumatic tires, may include passenger tires, truck/bus tires, off-road tires, agricultural tires and industrial tires. These tires and their common and distinct features are well known in the art. For example, agricultural and industrial tires include those described in, for example, U.S. Patent Publication No. 2005/0139302 A1, and U.S. Pat. Nos. 3,844,326, 4,202,391, 4,611,647, 4,791,971, 4,649,976, 5,046,541, 5,063,573, 5,188,683, 5,337,814, 5,337,816, 5,421,388, 5,464,050, 5,901,765, 6,179,027, 6,260,594, 6,263,933, 6,450,221, and 6,481,479, each of which is hereby incorporated by reference. All terrain or off-road tires include those described in, for example, U.S. Pat. Nos. 4,881,586, 5,259,429, 5,318,086, 5,375,640, 6,293,323, 6,298,890, 6,401,774, 6,799,617, and 6,929,044, each of which is hereby incorporated by reference.

Various modifications and alterations that do not depart from the scope and spirit of this invention will become apparent to those skilled in the art. This invention is not to be duly limited to the illustrative embodiments set forth herein.

What is claimed is:

1. A method of preparing a tire, the method comprising steps of:
   (i) providing a cured tire, the cured tire including a first bead, a second bead, a carcass layer extending from the first bead to the second bead, and an innerliner layer disposed interior to the carcass layer;
   (ii) applying a pair of reinforcing members to the innerliner layer of the cured tire; and
   (iii) applying an air barrier composition to the pair of reinforcing members with the cured tire, and to a portion of the innerliner layer of the cured tire to thereby form an air barrier layer on the cured tire, wherein the air barrier layer is a phase-separated polymeric system wherein an elastomeric component is phase separated from a thermoplastic component, wherein the air barrier layer includes a permeability to oxygen ($P(O_2)$) of less than 250 cc·mm/m$^2$·day·atm as measured in accordance with ASTM method F1927-14.

2. The method of claim 1, wherein the reinforcing members are substantially capable of supporting the cured tire in a run flat condition.

3. The method of claim 1, the cured tire having a tread with a first edge and a second edge, where a first reinforcing member of the pair of reinforcing members extends generally from the first edge of the tread to the first bead, and where a second reinforcing member of the pair of reinforcing members extends generally from the second edge of the tread to the second bead.

4. The method of claim 1, wherein the reinforcing members are elastomeric.

5. The method of claim 1, where the air barrier composition includes a phase-separated blend of a polyurethane as a continuous phase and a polysulfide elastomer as a discontinuous phase.

6. The method of claim 1, wherein the step of applying an air barrier composition includes allowing the air barrier composition to cure to the portion of the innerliner layer of the cured tire.

7. The method of claim 1, wherein each of the pair of reinforcing members consists of one crescent-shaped member.

8. A method of preparing a tire, the method comprising steps of:
  (i) providing a cured tire, the cured tire including a first bead, a second bead, a carcass layer extending from the first bead to the second bead, and an innerliner layer disposed interior to the carcass layer;
  (ii) applying a pair of reinforcing members to the innerliner layer of the cured tire, each of the pair of reinforcing members having a first longitudinal edge; and
  (iii) applying an air barrier composition to a portion of the innerliner layer of the cured tire to thereby form an air barrier layer on the cured tire, wherein the air barrier layer is formed only between each first longitudinal edge of the pair of reinforcing members, wherein the air barrier composition is a phase-separated polymeric system wherein an elastomeric component is phase separated from a thermoplastic component, wherein the air barrier layer includes a permeability to oxygen ($P(O_2)$) of less than 250 cc·mm/m$^2$·day·atm as measured in accordance with ASTM method F1927-14.

9. The method of claim 8, wherein each of the pair of reinforcing members consists of one crescent-shaped member.

\* \* \* \* \*